United States Patent [19]

Church

[11] Patent Number: 5,165,273
[45] Date of Patent: Nov. 24, 1992

[54] TIRE INSPECTION APPARATUS

[76] Inventor: Clyde M. Church, 1325 E. Wesleyan Dr., Tempe, Ariz. 85282

[21] Appl. No.: 719,726

[22] Filed: Jun. 24, 1991

[51] Int. Cl.$^5$ .......................................... G01M 17/02
[52] U.S. Cl. ...................................... 73/146; 254/50.2; 254/50.3; 254/50.4
[58] Field of Search ................. 73/146; 254/50.1, 50.2, 254/50.3, 50.4

[56] References Cited

U.S. PATENT DOCUMENTS

| | | | |
|---|---|---|---|
| 1,863,764 | 6/1932 | Prentice | 254/50.2 |
| 3,542,340 | 11/1970 | Peisl | 254/50.3 |
| 4,160,537 | 7/1979 | Severson | 254/50.3 |
| 4,169,373 | 10/1979 | Clark et al. | 73/146 |
| 4,297,876 | 11/1981 | Weiss | 73/146 |
| 4,678,163 | 7/1987 | Hjorth-Hansen | 254/50.2 |
| 4,936,138 | 6/1990 | Cushman et al. | 73/146 |

OTHER PUBLICATIONS

"The Branick AH/RI Adjustable Height Repair-Inspector . . . ", Supplement to Catalog TSE-86.

Primary Examiner—Donald O. Woodiel
Attorney, Agent, or Firm—Cahill, Sutton & Thomas

[57] ABSTRACT

The support structure of tire inspection apparatus is provided with a parallelogram system which permits the structure to be elevated to an inspection position and lowered to a loading position. A ramp is associated with a pair of parallelogram system legs at the forward end of the support structure to facilitate loading of heavy tires.

5 Claims, 1 Drawing Sheet

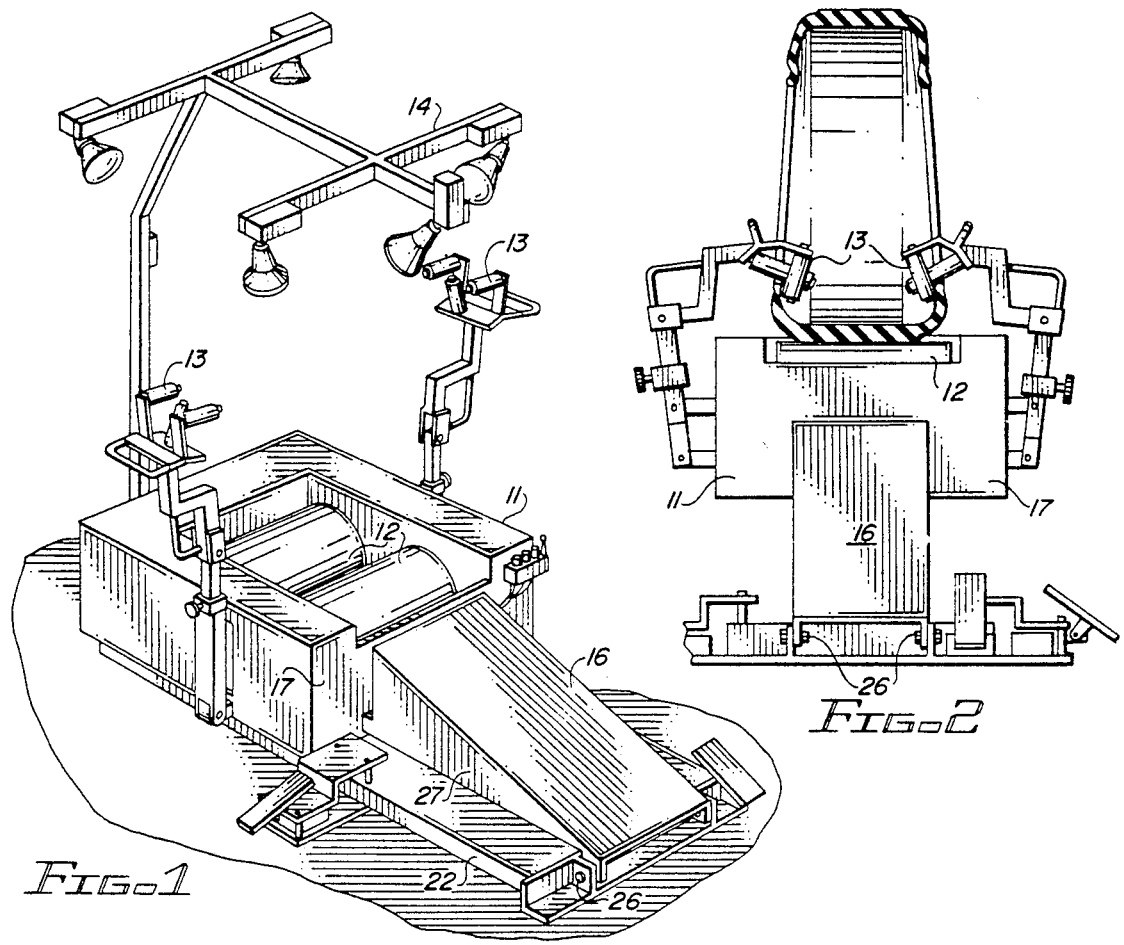
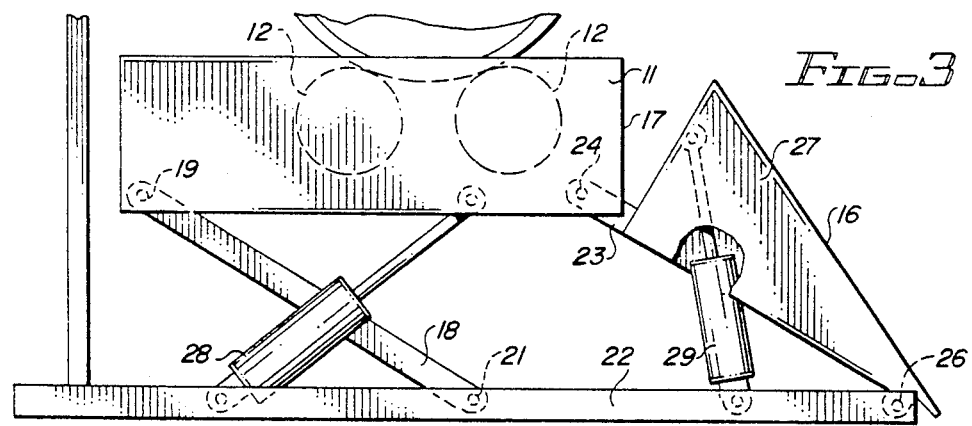
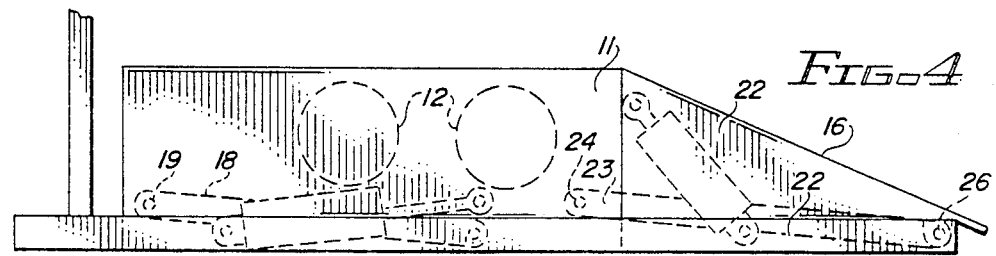

TIRE INSPECTION APPARATUS

TECHNICAL FIELD

This invention is concerned with facilitating the inspection of the interior of a tire casing, particularly truck tire casings, prior to retreading.

BACKGROUND ART

Numerous machines have been devised for supporting a motor vehicle tire in an upright position, spreading opposed bead regions of the tire to expose its interior to inspection, and rotating the tire to progressively inspect the interior of the entire tire carcass.

One of the earlier such machines is disclosed in U.S. Pat. No. 1,863,764, granted Jun. 21, 1932, to W. G. Prentice for "Tire Machine". This machine supports the tire in an elevated position above the floor at a comfortable working height for the person inspecting the tire. Such an arrangement, although possibly satisfactory for inspecting lightweight passenger car tires, places a tremendous burden on persons trying to lift a heavy truck tire onto the machine.

It was inevitable that some inventor would devise a mechanism for assisting the operator inspector in lifting the tire onto the inspection machine. U.S. Pat. No. 4,160,537, granted Jul. 10, 1979, to L. A. Severson for "Tire Spreading and Inspecting Machine" discloses a pneumatically powered lift for this purpose. Another approach to solving the problem of lifting heavy tires is represented in U.S. Pat. No. 3,542,340, granted Nov. 24, 1970, to J. Peisl for "Apparatus for the Control and Examination of Wheel Tires". This inventor separates the tire support and rotating apparatus from the bead spreading apparatus. The support apparatus is made movable from a lower, loading position to a raised, inspecting position by mounting it on a pneumatic lift. Unfortunately, this considerably complicates the construction of the bead spreading apparatus inasmuch as it must be moved out of the way of the tire as the tire is elevated.

Arne Hjorth-Hansen in his U.S. Pat. No. 4,678,163, granted Jul. 7, 1987, for "Tire Handling Apparatus" discloses another approach to tire inspection. Hjorth-Hansen incorporates the tire supporting and rotating apparatus in a fairly low profile box which also supports the bead spreading apparatus. Because the tire supporting structure is a fairly short distance above the floor, the inventor suggests that the tire can be bounced onto the support over a forward protruding edge member. This maneuver can be awkward with very heavy truck tires.

Lastly, in an inspection machine identified as the Branick AH/RI, manufactured by Branick Industries, Inc. of Fargo, N.D., a ramp member is pivotally hung to the front of the support structure to assist in loading the tire onto the support. The ramp serves no useful purpose when the tire is in place and elevated to working height.

DISCLOSURE OF THE INVENTION

This invention contemplates housing the tire support and rotation apparatus in a fairly low profile support structure. This structure also supports and contains apparatus for propelling the bead spreading apparatus. A parallelogram arm system is provided for guiding the support structure between a lower, loading position and an elevated, inspecting position. A ramp structure which is physically associated with portions of the parallelogram arm system not only makes it possible to roll large, heavy tires onto the support structure when the latter is lowered, but also assist in guiding and supporting the support structure when it is elevated.

BRIEF DESCRIPTION OF THE DRAWINGS

The invention is described in greater detail hereinafter by reference to the accompanying drawings, wherein:

FIG. 1 is a perspective view of tire inspection apparatus embodying this invention;

FIG. 2 is a frontal elevational view of the apparatus with the tire support structure in an elevated, inspection position;

FIG. 3 is a partial side elevational view of the apparatus shown in FIG. 2 with portions broken away to show the interior; and FIG. 4 is a side elevational view of the apparatus with the tire support structure in its lowered, loading position.

BEST MODE FOR CARRYING OUT THE INVENTION

Referring particularly to FIG. 1, the tire inspection apparatus there depicted includes tire support structure 11 having a pair of rollers 12 in an upper region thereof. Rollers 12 provide supporting surfaces for a tire resting on the rollers in an upright position. Drive means (not shown) housed in support structure 11 rotate rollers 12 under control of the inspector to effect rotation of the tire during inspection.

Support structure 11 is movable between the lowered, loading position (shown in FIG. 1) to an elevated, inspection position (shown in FIGS. 2 and 3). In the latter position, a pair of spreader arms 13 are swung into the tire casing and moved apart by a drive mechanism (not shown) in support structure 11. When the spreader arms are pulled apart, they spread apart opposite regions of the tire beads as shown in FIG. 2 to expose the interior of the tire for inspection. The drive mechanism for the rollers 12 may then be energized to rotate the tire and permit progressive inspection of the entire inner walls of the tire casing. If desired, a light tree 14 may be provided above the support structure 11 to illuminate the interior of the tire.

As thus far described, the tire inspection apparatus of this invention operates pretty much like some of the prior art machines referred to previously. This invention is particularly concerned with providing a low cost, reliable mechanism for facilitating the placement and removal of heavy truck tires on the support structure 11.

In accordance with this invention, a ramp 16 is provided at the forward end 17 of support structure 11. Further in accordance with this invention, this ramp 16 is structurally associated with a parallelogram system of legs for guiding the support structure 11 in movement between its lowered, loading position and its elevated, inspection position.

Referring particularly to FIGS. 3 and 4, this parallelogram system includes a first pair of legs 18 (only one of the pair appears in the drawing). The first, or rear, pair of legs 18 has one end of each leg pivotally connected at 19 to the support structure 11 near the rear end thereof. The first legs 18 extend forwardly with respect to the support structure 11 and have their opposite ends pivotally connected at 21 to a stationary structure such as a frame 22. The parallelogram system also includes a second, or front, pair of legs 23 (again only one of the pair being shown in the drawings). This second pair of legs 23 have one end of each leg pivotally connected at 24 to the support structure 11. Legs 23 extend forwardly of the support structure 11 and have their opposite ends pivotally connected at 26 to the frame 22.

Ramp 16 is structurally connected to the forward pair of legs 23 by means of side plates 27 which are welded or otherwise affixed to the legs 23 and the ramp 16. Arrangement is such that any movement of front legs 23 is accompanied by a like movement of ramp 16. Moreover, ramp 16 and side plates 27 serve to reinforce and strengthen the legs 23 and the legs do the same for the ramp. There is thus provided a reliable ramp 16 structure utilizing a minimum of material for achieving maximum strength and rigidity. The ramp 16 is thereby able to absorb and withstand repeated blows from heavy tires being rolled onto the support structure.

It will also be observed that with the support structure 11 in its lower, loading position (FIG. 4) in which the ramp is used, both pairs of legs 18 and 23 of the parallelogram system act through the frame 22 and the support structure 11 to resist unwanted rearward movement of the ramp during tire loading. This contributes to the reliability and safety of the apparatus.

Any suitable power mechanism may be used to raise and lower the support structure 11 as guided by the parallelogram leg pairs 18 and 23. The preferred mechanism is that illustrated in FIGS. 3 and 4 wherein at least one pneumatic cylinder 28 and preferably a second pneumatic cylinder 29 are pivotally connected to the frame and, respectively, to the support structure 11 and the ramp side plates 17.

When air is introduced into cylinders 28 and 29, the support structure is elevated to its inspection station. When air is allowed to escape from the cylinders, the support structure descends to its loading position. Movement in both directions is guided by the parallelogram leg pairs 19 and 23.

The use of more than one pneumatic cylinder 28 and 29 permits the size of the individual cylinders to be held to a minimum.

From the foregoing, it should be apparent that this invention provides reliable tire inspection apparatus capable of handling large truck tires with a minimum of effort on the part of the inspector.

What is claimed is:

1. Tire inspection apparatus comprising a support structure including means for supporting and rotating a tire in an upright position, said support structure further comprising means for spreading apart opposed bead regions of the tire to facilitate inspection of the tire, said support structure being movable from a lowered, loading position to an elevated, working position, said supporting structure having a forward end over which a tire is loaded thereon, a ramp positioned at the forward end of the supporting structure to facilitate loading the tire on said structure, a parallelogram system of arms for guiding movement of said support structure between its loading position and its working position, said ramp being connected to and movable with said parallelogram system of arms.

2. The inspection apparatus of claim 1, further characterized in that said parallelogram system of arms comprises a first pair of arms pivotally connected to said support structure and having their opposite ends extending toward the forward end of the structure and a second pair of arms pivotally connected to said support structure near the forward end of the structure and having their opposite ends extending forwardly of said structure, said ramp being connected to and movable with said second pair of arms.

3. The inspection apparatus of claim 2, further characterized in that said first and second pair of arms have their opposite ends pivotally connected to a frame.

4. The inspection apparatus of claim 2, further comprising at least one pneumatic cylinder for raising and lowering the support structure.

5. The inspection apparatus of claim 2, further comprising more than one pneumatic cylinder for raising and lowering the support structure.

* * * * *